United States Patent [19]

Port et al.

[11] Patent Number: 4,948,970

[45] Date of Patent: Aug. 14, 1990

[54] RADON MEASURING DEVICE

[75] Inventors: Eli A. Port, Evanston; John M. Bitner, Naperville; Irwin P. Lazarus, Skokie; Terry W. Liaboe, Highland Park; Richard E. Toohey, Downers Grove, all of Ill.

[73] Assignee: Radiation Safety Services, Inc., Morton Grove, Ill.

[21] Appl. No.: 299,036

[22] Filed: Jan. 23, 1989

[51] Int. Cl.$^5$ ........................ G01T 1/169; G01T 5/00
[52] U.S. Cl. .................................. 250/253; 250/255; 250/472.1
[58] Field of Search .................. 250/253, 472.1, 255

[56] References Cited

U.S. PATENT DOCUMENTS

| D. 268,520 | 4/1983 | Le Claire, Jr. | D23/369 |
|---|---|---|---|
| 2,500,896 | 3/1950 | Drake | 239/51.5 |
| 2,555,047 | 5/1951 | Logue | 239/58 |
| 2,657,090 | 10/1953 | Meek | 239/55 |
| 2,755,954 | 7/1956 | Antritter | 220/4 B |
| 2,830,845 | 4/1958 | Cottle | 239/43 |
| 3,283,153 | 11/1966 | Geiger | 250/475.2 |
| 3,505,523 | 4/1970 | Becker | 250/473.1 |
| 3,655,975 | 4/1972 | Evans | 250/475.2 |
| 3,665,194 | 5/1972 | Alter et al. | 250/253 |
| 3,783,292 | 1/1974 | Alter et al. | 250/475.2 |
| 4,014,501 | 3/1977 | Buckenmayer | 239/58 |
| 4,063,087 | 12/1977 | Fleischer | 250/253 |
| 4,064,436 | 12/1977 | Ward, III | 250/253 |
| 4,065,972 | 1/1978 | Holub et al. | 73/864.52 |
| 4,258,004 | 3/1981 | Valenzona et al. | 422/123 |
| 4,372,490 | 2/1983 | Le Claire, Jr. | 239/59 |
| 4,385,236 | 5/1983 | Hassib et al. | 250/472.1 |
| 4,457,445 | 7/1984 | Hanks et al. | 220/214 |
| 4,518,860 | 5/1985 | Alter et al. | 250/253 |
| 4,778,992 | 10/1988 | Wheeler | 250/255 |
| 4,800,272 | 1/1989 | Harley et al. | 250/253 |

OTHER PUBLICATIONS

Mark L. Maiello and Naomi H. Harley, "EGARD: An Environmental γ-ray and $^{222}$Rn Detector," *Health Physics*, vol. 53, No. 3, (Sep. 1987), pp. 301-305, [©1987 Health Physics Society].

J. Bigu and R. Raz, "Passive Radon/Thoron Personal Dosimeter Using an Electrostatic Collector and a Diffused-Junction Detector," *Review of Scientific Instruments*, vol. 56, No. 1, (Jan. 1985), pp. 146-153, [©1985 American Institute of Physics].

Frank et al., "A Diffusion Chamber Radon Dosimeter for Use in Mine Environment", Nuclear Instruments & Methods, 109, pp. 537-539, 1973.

Frank et al., "Radon Dosimetry Using Plastic Nuclear Track Detectors", Nuclear Track Detection, vol. 1, No. 3/4, pp. 149-179, 1977.

Urban et al., "Low Level Environmental Radon Dosimetry with a Passive Track Etch Detector Device", Radiation Protection Dosimetry, vol. 1, No. 2, pp. 97-109, 1981.

Frank et al., "Properties of a Small Radon Diffusion Chamber with Plastic Track Detectors", Solid State Nuclear Track Detectors, pp. 531-534, 1982.

Domanski et al., "The Performance of Passive Differentiating Track Detectors Containing a Diffusion Barrier", Radiation Protection Dosimetry, vol. 2, No. 1, pp. 27-32, 1981.

Miles et al., "Trial of a Passive Radon Dosemeter for Miners in Wheal Jane Mine", Radiation Protection Dosimetry, vol. 5, No. 2, pp. 95-100, 1983.

Urban et al., "Applications of Passive Radon Dosemeters in Mining Areas", Canadian Nuclear Association, pp. 386-389, 1984.

Urban, "Passive One-Element Track Etch Dosemeter for Simultaneous Measurement of Radon, Thoron and Decay Products in Air", Nuclear Tracks, vol. 12, Nos. 1-6, pp. 685-688, 1986.

*Primary Examiner*—Constantine Hannaher

*Attorney, Agent, or Firm*—Silverman, Cass & Singer, Ltd.

[57] ABSTRACT

A radon measuring device having a housing formed by at least two mating portions. The housing includes a plurality of apertures along at least one of its surfaces to permit entry of ambient atmosphere into said housing, a membrane or filter positioned proximate an interior surface of the housing covering the apertures for filtering the ambient atmosphere which enters the housing, and a radon detector within the housing positioned in a plane substantially normal to the surface of the housing containing the apertures. The housing can also include a filter holder within its interior for positioning both the filter and the detector in their respective positions as well as alignment tracks for alignment of the filter holder with respect to the housing.

24 Claims, 2 Drawing Sheets

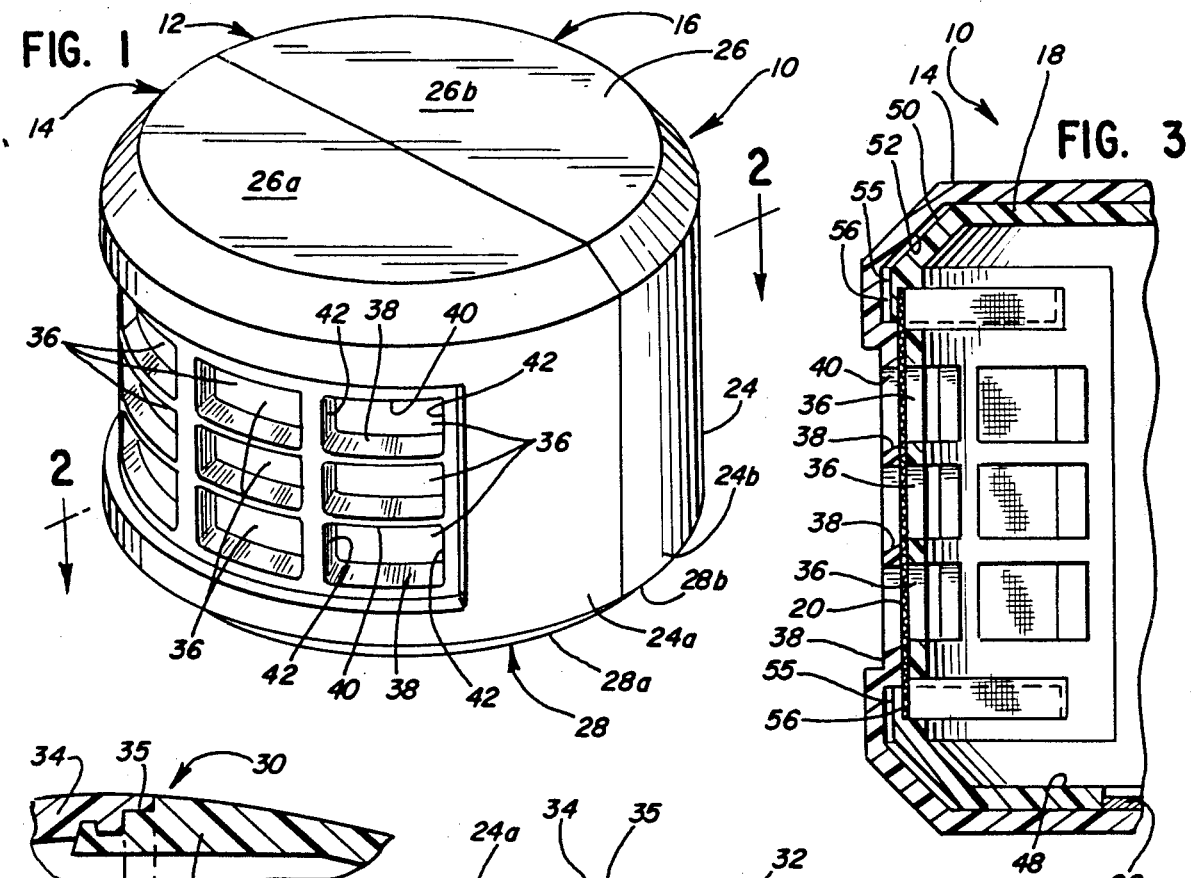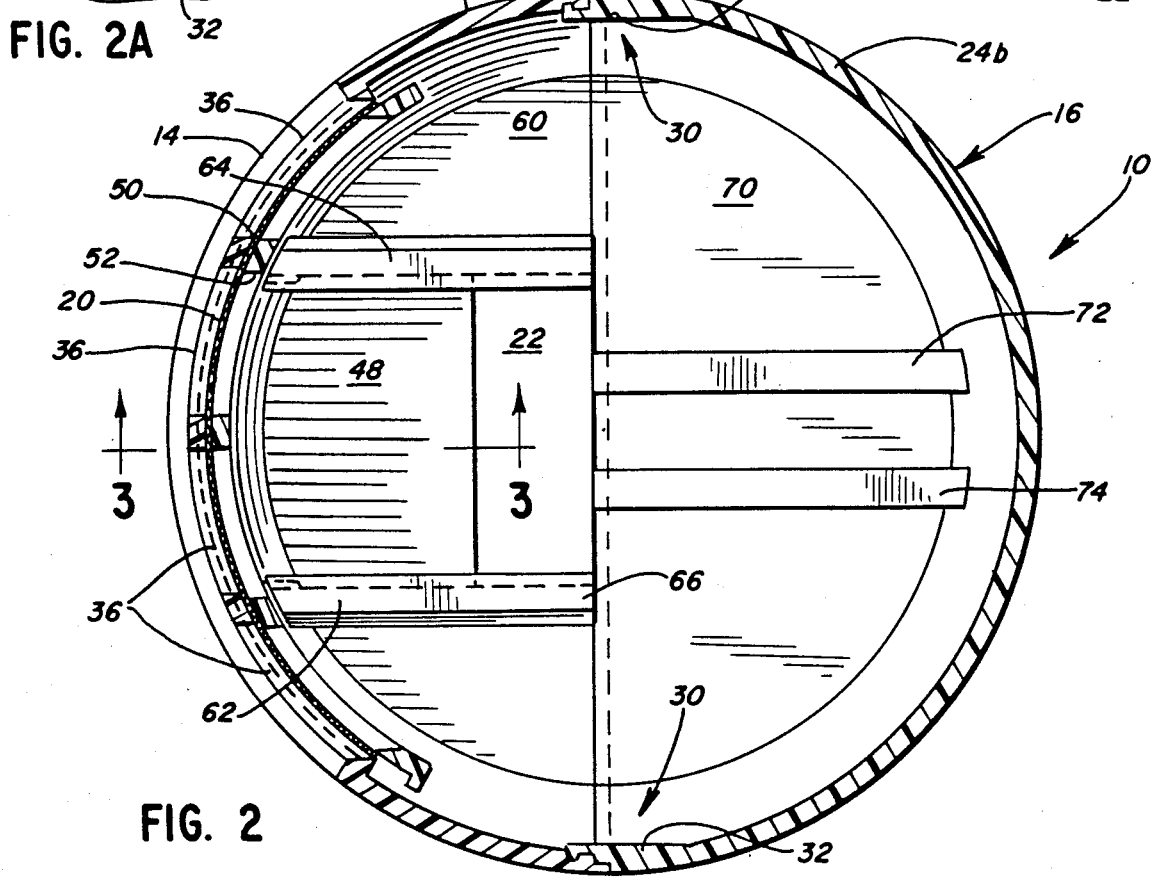

RADON MEASURING DEVICE

BACKGROUND OF THE INVENTION

This invention relates generally to dosimeters for measuring radon and more particularly, to a passive radon measuring device having a two-piece housing or diffusion chamber and a mounting insert for positioning both a membrane or filter and a radon track etch or energy sensitive detector within the diffusion chamber Radon is a colorless, tasteless, and odorless radioactive gas that results from the natural breakdown or radioactive decay of radium. Radon typically is found in high concentrations in soils and rocks containing uranium. It is believed that human exposure to elevated levels of radon can lead to an increased risk of developing lung cancer, depending upon the concentration of radon and the length of exposure.

Recent studies have indicated that radon can accumulate in dangerous concentrations in residences and other structures, and particularly in the lower levels of buildings which typically have poor ventilation and into which radon enters from the surrounding soil. Radon can enter a structure in numerous ways including through the water supply, dirt floors, cracks in masonry floors and walls, floor drains, sumps and similar openings in the foundation of the structure.

Various methods and devices have been employed for detecting radon. The two least expensive and most readily available devices are the charcoal canister and the alpha track detector. Both of these devices are passive devices that are exposed to the air in a home or other structure for a prescribed period of time and are then sent to a laboratory for analysis. Although charcoal canisters are usable for a test period of one to seven days, they are somewhat less reliable than alpha track detectors.

The most basic alpha track detector is constructed as a housing or diffusion chamber in the form of a small cup having a strip of alpha track registration material affixed to the inside of the housing. When the track registration material is exposed to radon or its progeny (radioactive decay products of radon) the alpha particles produced by the radioactive decay of the radon or progency cause minute damage tracks to occur on the material. Such tracks can subsequently be enlarged and made visible by chemical or electrochemical etching, for instance, and the concentration of radon present in a particular test area can be measured.

Although an isolated piece of track registration material can be placed in an environment for detection of radon, it is preferable that some type of housing or diffusion chamber be used, such as the cup housing referred to above. A housing and membrane or filter isolates the registration material from the ambient air, which may contain concentrations of radon progeny, and enables the material to be exposed to radon entering the housing from the environment and the daughters produced in the housing. Additionally, it is desirable to provide a membrane or filter over the entrance to the housing to prevent contamination from other sources. The sensitivity of these types of detectors depends upon the size, shape and material used in their construction. More importantly, the position of the detector strip within the device can also affect the performance and reliability of these detectors. Care must also be taken to prevent tampering with the detector before analysis in the laboratory, as well as maintaining the detector in an optimum position for receiving alpha particles from radon and its progeny within its interior during the test period.

One example of a radon detector having a housing and a filter is disclosed in U.S. Pat. No. 4,518,860. That patent discloses a track registration detector for radon and radon progeny products having a housing with a removable circular apertured closure cap for retaining a strip of track registration material within its interior. The strip is retained within the housing by integrally formed upstanding ribs which form both a pedestal support and a transverse support for the strip and position the strip in juxtaposition with the apertures of the cap with a circular filter sandwiched therebetween. The presence of radon is measured on the side of the strip opposite the filter and apertured cap. The cap includes a solid circular portion in its center to provide a radiation absorber shield for the top surface of the strip. The entrance area of this detector is capable of being blocked by an item positioned adjacent to the apertures, and, since the detector is typically placed with its apertured cap facing upward, can become clogged by dust and dirt particles falling naturally within the ambient air.

Other detectors are of a size most suitable for use as a personal dosimeter or for exploration purposes.

The present invention provides a track etch radon detector which is of relatively uncomplicated construction and yet achieves the desired advantages of permitting free flow of radon within its interior without exposing the track registration material to ambient air, reduces the chance of becoming blocked with foreign material or adjacent items, and which provides a seal of the component parts to resist and/or prevent tampering other than by an authorized testing facility. The construction of the invention has a relatively large sensitive volume and detector area and therefore can be used for the same time period as charcoal canisters but without the inadequacies of such charcoal canisters.

SUMMARY OF THE INVENTION

The invention is characterized by a radon measuring device having a housing formed by at least two mating portions secured together, in which at least one of the mating portions includes a plurality of apertures for the passage of radon from the ambient atmosphere into the interior of the housing. A membrane or filter is positioned within the housing proximate the apertures to filter the ambient atmosphere passing into the housing. A radon detecting element is positioned within the housing interior for measuring radon in the ambient atmosphere passing into the housing. The detecting element is positioned along a plane which is normal to the plane upon which the apertures of the housing are positioned.

The device also can include a filter holder for positioning both the filter and/or the radon detecting element at desired positions within the housing. The insert can include outwardly extending tab projections for registry with corresponding alignment tracks formed on the inside surface of the housing for alignment of the insert with respect to the housing.

Various objects and advantages of the invention will become apparent in accordance with the disclosure herein in which the preferred embodiment is described in detail in the specification and illustrated in the accompanying drawings. It is contemplated that minor variations may occur to the skilled artisan without departing from the scope or sacrificing any of the advantages of the invention.

BRIEF DESCRIPTION OF THE DRAWINGS

FIG. 1 is a perspective view of the assembled housing embodying the radon measuring device of the invention;

FIG. 2 is a sectional view taken along the line 2—2 of FIG. 1, in the direction indicated generally;

FIG. 2a is an enlarged fragmentary view of a portion of FIG. 2 illustrating the fastening member of the housing in greater detail;

FIG. 3 is a sectional view taken along the line 3—3 of FIG. 2, in the direction indicated generally;

DESCRIPTION OF THE PREFERRED EMBODIMENT

Figure 4:
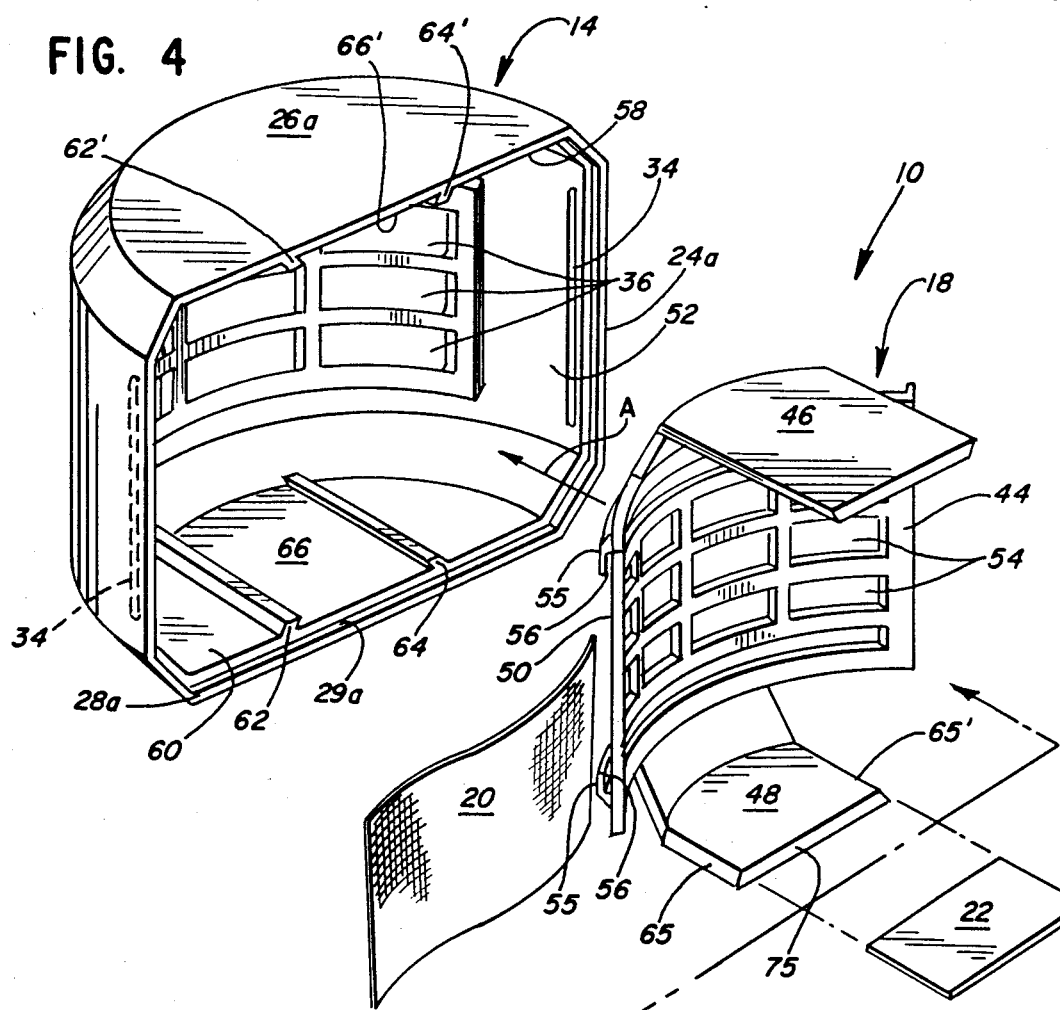
FIG. 4 is an exploded perspective view of the housing illustrating the two-piece construction of the housing, the filter holder, the membrane or filter and the radon detecting foil.

Referring to FIGS. 1 and 4, the radon measuring device embodying the invention is designated generally by the reference numeral 10. The device 10 includes a housing 12 having a first housing portion 14 and a second housing portion 16, a filter holder 18, a filter 20 and a radon detector or foil 22.

The housing 12 is generally in the form of a right circular cylinder and includes a cylindrical side wall 24 having a predetermined height that is enclosed on its ends by end walls 26 and 28. Typically, the housing 12 is positioned during use as illustrated in FIG. 1, with its longitudinal axis substantially parallel to the vertical plane. It may also be used with the longitudinal axis in the horizontal or other plane.

The housing 12 is preferably formed by joining the two housing mating portions or mating halves 14 and 16 which are substantially identical in size and dimension and are semicylindrical in shape. Separation of the housing 12 is thereby accomplished along a diameter line passing through the circular end walls 26 and 28. It is to be understood, however, that the particular shape of the housing portions 14 and 16 as well as the position of their parting line can vary and the housing portions 14 and 16 need not be identical mating halves.

The housing portions 14 and 16 include semi-cylindrical side walls 24a and 24b respectively, as well as respective end walls 26a, 26b, 28a and 28b. If desired, the corner between the side wall 24 and the end walls 26 and 28 can be beveled. As FIG. 4 illustrates, in order to provide an overlap between the two housing portions 14 and 16 to form a more effective seal therebetween, the second housing portion 16 can include an outwardly extending flange 29 around the perimeter of its open face for cooperation with a reduced portion or recess 29a formed around the perimeter of the open face of the first housing portion 14. The housing 12 can be constructed of a plastic material having an electrostatic property similar to that of the detector foil 22 or of conductive material so that the housing 12 does not attract, repel or otherwise affect the free movement of alpha particles emitted therein. If the housing forming material has electrostatic properties the same as the foil, radon progeny will deposit throughout the housing. More preferably, the housing is constructed of electrically conductive static dissipative material with the result that radon progeny will tend to deposit uniformly on the foil, rather than unevenly and on the housing walls because of static charge build-up.

The two semi-cylindrical housing portions 14 and 16 are fastened together to form the cylindrical housing 12 by a fastening member 30. As FIGS. 2, 2a, and 4 illustrate, the fastening member 30 includes flexible lock arms 32, formed integral with the sidewall 24b on opposite sides of the second housing portion 16, for registry with corresponding abutments 34, positioned on the interior surface of the sidewall 24a on opposite sides of the first housing portion 14. Although FIG. 4 illustrates the lock arms S2 and abutments 34 as being of a tongue-and-groove arrangement, they can include an additional step portion 35, as illustrated in FIGS. 2 and 2a, which is actually part of the flange 29, in order to assist in sealing the housing 12 around the fasteners 30.

Preferably, the fastening member 30 is a tamper evident type of fastener that is easy to engage, yet is difficult to open without fracturing the wall 24 to indicate tampering. Alternatively, the fastener 30 can be any type of fastener so long as it functions as described and the two housing portions 14 and 16 remain secured together during use. Moreover, the positioning of the lock arms 32 and the corresponding abutments 34 can be interchanged with respect to the sidewalls 24b and 24a without departing from the teachings of the present invention.

To enable passage of ambient atmosphere into the housing 12, the first semi-cylindrical housing portion 14 includes, in the preferred embodiment, a plurality of apertures 36 positioned around the circumference of and extending through its side wall 24a. Although twelve apertures 36 are illustrated, the number and size of apertures 36 can vary so long as a free flow of radon from the ambient atmosphere into the housing 12 is provided.

As FIGS. 1 and 3 illustrate, in addition to the filter 20, to further guard against foreign matter from inadvertently entering the housing 12, the apertures 36 can be generally rectangular in shape and can be formed with bottom surfaces 38 that slope outwardly with respect to the interior of the housing 12. Accordingly, any foreign matter such as dust, dirt, or water which may come in contact with the housing 12 will be deflected away from the apertures 36 and the interior of the housing 12 by the sloped bottom surfaces 38. If desired, to further aid in reducing contamination within the interior of the housing 12 in addition to the sloping of the bottom surfaces 38, top surfaces 40 and side surfaces 42 of each aperture 36 similarly can be sloped (not illustrated) thereby providing the apertures 36 with a counter-sunk configuration.

Due to the positioning of the apertures 36 in the sidewall 24 rather than in the end surface 26, dust and dirt particles present in the air will not fall directly through the apertures 36 to settle on and block the filter 20. Moreover, the probability of blocking all of the apertures 36 by any item placed near the exterior of the housing 12, or by positioning the housing, is reduced, since such an item would be required to have a concave shape corresponding to the curvature of the housing 12 and be large enough to extend across all of the apertures 36 in order to block the same.

The filter holder 18 is semi-cylindrical in configuration and is sized and dimensioned generally similar to the side wall 24 of the housing portion 14 for registry therewith, but is slightly reduced in size so that it may fit within the interior of the housing portion 14. The filter holder 18 includes a semi-cylindrical side wall 44 and projecting top and bottom tab portions 46 and 48. The side wall 44 includes an exterior surface 50 which is designed for registry with an interior surface 52 of the first housing portion 14, as FIGS. 2, 3, and 4 illustrate. For passage of ambient radon through the filter holder 18 from the apertures 36 in the first housing portion 14, the side wall 44 further includes a plurality of apertures 54 that can be of size and dimension similar to that of apertures 36.

As described above, the membrane or filter 20 serves to exclude ambient radon progeny and other contamination within the housing 12. The membrane or filter preferably is formed from a material that separates radon from dust particles, aerosols, and radon progeny in the ambient atmosphere and is typically made of paper, fiberglass or other filter material or a semipermeable membrane material to a desired thickness and filtering capability. To position the membrane or filter 20 with respect to the apertures 36 and 54, the end portions of the exterior surface 50 of the filter holder 18 include outwardly extending flanges 55 which form slots 56 to accept the top and bottom portions of the filter 20. The flanges 55 and the slots 56 preferably span the length of the side wall 44 in the area of the apertures 36 but can be shorter and/or positioned at a plurality of different locations along the length of the side wall 44 if desired so long as the filter 20 is maintained in its proper position.

When the housing 12 is assembled, the slots 56 hold the filter 20 in position between the interior surface 52 of the first housing portion 14 and the exterior surface 50 of the filter holder 18 so that the filter 20 covers the apertures 36 and 54 and abuts against the interior surface 52 as will be explained later. Accordingly, ambient atmosphere cannot pass into the interior of the housing 12 without first going through the filter 20. Alternatively, the flanges 55 can be formed on the interior surface 52 of the first housing portion 14 to hold the filter 20 against the apertures 36 and the filter retaining portion of the filter holder 18 can be eliminated. In either case, the filter 20 of the present invention is preferably rectangular in shape. Since the filter material typically comes in rectangular shaped segments, excess waste material must be trimmed to form the circular shaped filters common in prior art radon detectors. Such trimming is not necessary with the rectangular filter 20 of the present invention, thereby eliminating waste material and reducing the overall cost of the device 10.

To align the filter holder 18 within the first housing portion 14 and provide proper alignment of the filter 20 with respect to the apertures 36 as described above, interior surfaces 58 and 60 of end walls 26a and 28a respectively of the first housing portion 14, each include two elongated, substantially parallel alignment tracks 62, 64, 62' and 64'. Each alignment track 62 and 64 can be slightly beveled toward each other and together they define a respective receiving channel 66, 66' therebetween. Preferably, the bottom tab 48 is of generally planar configuration formed with beveled edges 65, 65' to be matingly received between tracks 62, 64 such that tab 48 is retained within channel 66. Top tab 46 is similarly planar in configuration with beveled edges 67, 67' for receipt within tracks 62', 64' of the top channel 66. It is to be understood, however, that similar types of alignment means may be employed without departing from the teachings of the present invention. For example, as seen in the alternate embodiment of FIG. 5, the channel between tracks 62", 64" on the interior surface 60 can accept bottom tab 48' which rides above tracks 62"', 64"' with overlying depending portions or flanges 65", 65"'. Alternatively, both the top and bottom tabs 46 and 48 can include flanges such as 65" and 65"' to accept their respective alignment tracks 62, 64, or the like.

To position the filter 20 in juxtaposition with the interior surface 52 of the first housing portion 14 and effectively screen the apertures 36, interior surfaces 68 and 70 of the end walls 26b and 28b respectively of the second housing portion 16 can each include positioning bars 72 and 74. As will be explained later, when assembled, the positioning bars 72 and 74 of the interior surface 68 can engage the top tab projection 46 directly in order to force the filter holder 18 in the direction of arrow "A" toward the interior surface 52 of the first housing portion 14. Similarly, the positioning bars 72 and 74 of the interior surface 70 can be formed to engage the foil 22 positioned between tracks 62, 64 against bottom tab projection 48 as described below. Accordingly, upon fastening of the fastening member 30, the filter 20 and the radon detecting foil 22 will be maintained in their desired positions.

Figure 5:
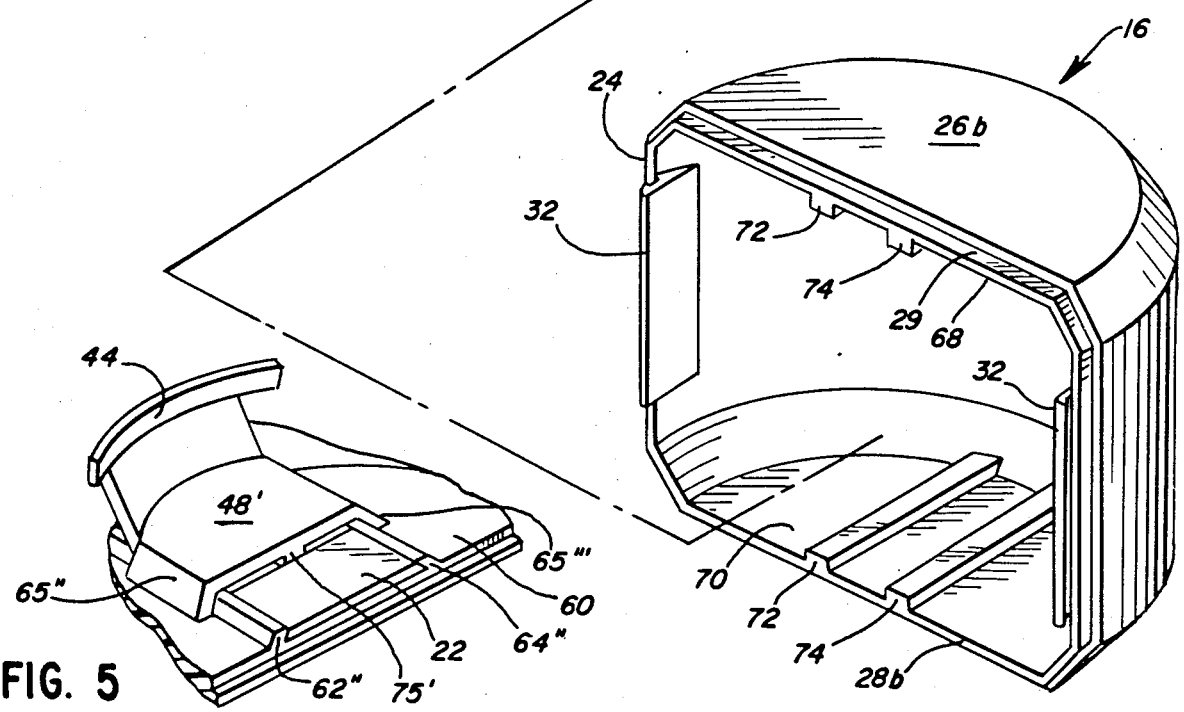
FIG. 5. is an enlarged fragmentary perspective view of an alternate embodiment of the invention showing the bottom portion of the housing and the filter holder illustrating the positioning of the radon detecting foil.

As FIG. 2 and alternate embodiment FIG. 5 illustrate, the radon detector 22 preferably is positioned within the recess 66 formed on the interior surface 60 of the housing portion 14. In this position, the radon detector 22 lies in a plane substantially normal to the semi-cylindrical side wall 24 and at approximately the geometric center of its plane. The detector is disposed in a plane which is parallel to the oppositely disposed flat plane defined by end walls 26 with the result that alpha particles striking the foil are as uniformly distributed as possible.

The detector 22 can be any type of desired alpha sensitive material such as, for example, a polycarbonate foil or similar type of detector. As FIGS. 4 and 5 illustrate, in order to enable proper exposure of the detector strip 22, the length of the tab 48, 48' of the filter holder 18 is to be less than the full length of the channel 66. Accordingly, when the device 10 is assembled, the detector strip 22 is positioned within the channel 66 between the tabs 48, 48' and the positioning bars 72 and 74 of the surface 70 of the second housing portion 16 and is exposed to the interior of the housing 12. The tab 48 (FIG. 4) has an end wall 75, against which the radon detector 22 abuts so that proper positioning of the detector strip is achieved. Tab 48' has a depending abutment 75' which functions in a like manner. A spacing member (not shown) may be inserted between end wall 75 or abutment 75' and detector 22 so that detector 22 is positioned in the geometric center of its plane. In such event, positioning bars 72 74 would be shortened along surface 70 to terminate before end wall 28b.

To assemble the device 10, the filter 20 is positioned within the slots 56 on the exterior surface 50 of the filter holder 18. The tabs 46 and 48 are then aligned with and inserted within the receiving channels 66 and the alignment tracks 62 and 64 on the interior surfaces 58 and 60 of the walls 26a and 28a of the first housing portion 14 respectively. Upon insertion of the filter holder 18, the membrane or filter 20 is moved into position against the interior surface 52 of the first housing portion 14 and the shortened bottom tab 48 enables positioning of the radon detector strip 22 in the channel 66 for proper exposure of the radon detector strip 22 within the interior of the housing 12. The radon detector strip 22 then is positioned within the channel 66 formed in the bottom interior surface 60 of the housing portion 14 against the end wall 75. Thereafter, the second housing portion 16 is aligned with and secured to the first housing portion 14 by fastening members 30 in an overlapping fashion as described hereinabove. During fastening, the top tab 46 of the filter holder 18 is simultaneously advanced toward the interior surface 52 by the positioning bars 72 and 74 of the interior surface 68 of the second housing portion 16, thereby forcing the membrane filter 20 against the interior surface 52. At the same time, the positioning bars 72 and 74 of the interior surface 70 of the second housing portion 16 engage the radon detector strip 22 to hold it in position against the end wall 75 within the channel 66. Accordingly, the device 10 is completely assembled and the two housing portions 14 and 16 cannot be opened without authorization except by fracturing the housing wall thereby providing an indication of such an unauthorized opening.

During use, the device 10 is positioned in an area where the concentration of radon is to be measured. As explained above, such an area is typically an enclosed area such as the basement of a structure or any other desired area. The device 10 may be positioned with its longitudinal axis parallel with the vertical plane and its end wall 26 facing upward. Alternatively, the device 10 can be provided with a hook on any convenient surface to suspend the device in any desired location. Thereafter, the device 10 is left in the area for a prescribed period of time, typically one to 52 weeks. After such time has passed, the device 10 is then sent to a designated laboratory for analysis. Upon arrival at the laboratory, the device 10 is first inspected for any signs of tampering and is then broken apart into its two housing halves 14 and 16. The radon detector 22 is then removed and the above described etching process is performed on the radon detector strip 22 to provide a measure of the concentration of radon in the monitored area.

Modifications and variations of the present invention are possible in light of the above teachings. For example, although the device 10 is illustrated for use as a stand alone unit, it also can be mounted to a wall or carried by a user. It is therefore to be understood that within the scope of the appended claims, the invention may be practiced otherwise than as specifically described.

What is claimed and desired to be secured by Letters Patent of the United States is:

1. A radon measuring device comprising:
a housing formed of at least two mating portions held together by fastening means, said housing including at least one vertically oriented wall and at least one aperture passing through said one wall to permit ambient atmosphere to enter said housing;
filter means positioned in the interior of said housing and covering said aperture for filtering radon progeny and other particles from said ambient atmosphere as it enters said housing;
radon detector means within said housing for measuring the concentration of radon in the ambient atmosphere, said detector means being positioned in a plane substantially normal to the surface of said one wall; and
a mounting member within the interior of said housing for positioning both said filter means and said radon detector means.

2. A radon measuring device comprising:
a housing formed of at least two mating portions held together by fastening means, said housing including at least one vertically oriented wall and at least one aperture passing through said one wall to permit ambient atmosphere to enter said housing, said mating portions including first and second semi-cylindrical mating halves of substantially equal size and dimension enclosed on their respective ends so that when fastened together they form a cylindrical housing parted along its longitudinal axis;
filter means positioned in the interior of said housing and covering said aperture for filtering radon from other particles of said ambient atmosphere as it enters said housing; and
radon detector means within said housing for measuring the concentration of radon in the ambient atmosphere, said detector means being positioned in a plane substantially normal to the surface of said one wall.

3. The device as defined in claim 2 wherein there are a plurality of apertures formed in a cylindrical side wall of said housing and wherein said side wall extends substantially normal to said plane containing said radon detector means.

4. The device as defined in claim 3 wherein said housing includes a semi-cylindrical filter holder having a plurality of apertures extending through its cylindrical side wall for registry with said interior surface of the cylindrical side wall and apertures of said housing and for positioning said filter means between said filter holder and said interior surface of said housing and for further positioning said detector means.

5. The device as defined in claim 4 wherein said filter holder includes first and second tab projections on respective top and bottom edges so that when said holder is in registry with said interior surface of said housing, said tab projections extend toward the interior of said housing away from said interior surface of said housing to position and stabilize said holder within said housing.

6. The device as defined in claim 5 wherein said filter holder includes means for holding said filter means against said interior surface of said housing between said apertures of said housing and said apertures of said holder.

7. The device as defined in claim 6 wherein said second bottom tab projection includes means for positioning said detector means so that said detector means can be exposed to alpha particles from radon in said ambient atmosphere passing through said apertures of said housing and said holder and through said filter and to alpha particles from radon progeny produced in said housing.

8. The device as defined in claim 7 wherein said top and bottom tab projections align with guide means, positioned on oppositely-facing interior surfaces respectively of said mating portion of said housing that includes said apertures, for guiding said filter holder into position within said housing and for properly aligning said filter means and said detector means with respect to said apertures of said housing.

9. The device as defined in claim 8 wherein said housing includes positioning means formed on oppositely-facing interior surfaces of said non-apertured mating portion for engaging said holder and said detector means, and abutting said filter means against said apertures of said housing upon fastening of said two mating portions.

10. The device as defined in claim 9 wherein said fastening means includes arms and abutments positioned respectively on said mating portions for co-joinder to retain said portions together 11. The device as defined in claim 10 wherein said filter means is of generally rectangular configuration.

12. The device as defined in claim 3 wherein said apertures are of generally rectangular configuration formed with bottom surfaces that slope outwardly with respect to the interior of the housing.

13. The device as defined in claim 12 wherein said apertures are of counter-sunk configuration.

14. The device as defined in claim 2 in which said radon detector means is flat and is positioned in a plane which is substantially parallel to the plane defined by the circular ends of the housing.

15. The device as defined in claim 14 in which said radon detector means is positioned at approximately the geometric center of said plane which is substantially parallel to the planes defined by the circular ends of the housing.

16. A radon measuring device comprising:
a housing formed of at least two mating portions held together by fastening means, said housing being constructed of electrically conductive static dissipative material and including at least one vertically oriented wall and at least one aperture passing through said one wall to permit ambient atmosphere to enter said housing;
filter means positioned in the interior of said housing and covering said aperture for filtering radon from other particles of said ambient atmosphere as it enters said housing; and
radon detector means within said housing for measuring the concentration of radon in the ambient atmosphere, said detector means being positioned in a plane substantially normal to the surface of said one wall.

17. A radon measuring device comprising:
a two-piece cylindrical housing including a cylindrical shaped side wall having a predetermined height enclosed on its ends by circular shaped walls, said cylindrical housing being parted along its longitudinal axis and being formed by first and second semi-cylindrical shaped mating halves of substantially equal size and dimension, at least one of said halves including at least one aperture extending through its side wall to permit entry of radon in the ambient atmosphere into said housing;
fastening means for holding said first and second mating halves together to form said housing;
filter means positioned adjacent to an interior surface of said apertured side wall of said housing and covering said aperture for filtering radon progeny and other particles from said ambient atmosphere passing into said housing through said apertures;
radon detector means within said housing for measuring the concentration of radon; and
mounting means within said housing for positioning said filter and said detector means within said housing, said mounting means including a semi-cylindrical shaped filter holder including a semi-cylindrical side wall having a predetermined height and at least one aperture, said side wall and said aperture of said filter holder being sized and dimensioned for registry with said interior surface of said apertured mating half with said filter means positioned therebetween, said side wall of said filter holder including first and second tab projections on its top and bottom edges respectively, so that when said holder is in registry with said interior surface of said apertured mating half, said tab projections extend toward the interior of said housing away from said interior surface, said top and bottom projections being in planes substantially parallel to said circular shaped walls of said housing respectively and substantially normal to said side wall of said filter holder, said side wall of said filter holder including holding means for positioning said filter means between said side wall of said holder and said interior surface of said apertured mating half so that said filter means covers said aperture of said mating half, said housing including means for securing said detector means in a plane substantially normal to said apertured side wall of said mating half so that said detector means can be exposed to alpha particles from radon in said ambient atmosphere passing through said aperture of said housing and from radon progeny produced in said housing and said filter holder and through said filter.

18. The device as defined in claim 17 wherein the interior surfaces of said circular shaped walls of said apertured mating half each include first and second alignment tracks substantially parallel to one another and forming a tab receiving portion therebetween so that said tab projections can be seated within said receiving portions and said filter holder can be guided into proper position within said apertured mating half to place said filter means and said detector means in their respective positions.

19. The device as defined in claim 18 wherein at least one of said tab projections includes depending flanges for surrounding and accepting said alignment tracks.

20. The device as defined in claim 18 wherein the interior surfaces of said wall of said non-apertured mating half includes at least one positioning bar for engaging said filter holder and forcing said holder against said interior surface of said apertured mating half so that said filter means abuts said interior surface and covers said aperture of said apertured mating half and maintains said filter means in this position upon fastening of said two mating halves together.

21. The device as defined in claim 20 wherein said wall of said non-apertured mating half includes at least one positioning bar for engaging said filter holder.

22. The device as defined in claim 21 wherein said positioning bar of the wall of the non-apertured mating half engages said radon detector means for positioning same.

23. The device as defined in claim 20 wherein said fastening means is a tamper evident fastener which after fastening will provide an indication that said mating halves have been disengaged 24. The device as defined in claim 23 wherein said mating halves slightly overlap around the perimeters of their mating surfaces to seal said housing upon fastening.

* * * * *